Dec. 10, 1968   M. J. ZUCKER   3,415,583
CAPACITOR MOUNTING CASE
Filed July 18, 1966   2 Sheets-Sheet 1

INVENTOR.
MYRON J. ZUCKER
BY Whittemore,
Hulbert & Belknap
ATTORNEYS

Dec. 10, 1968 M. J. ZUCKER 3,415,583
CAPACITOR MOUNTING CASE
Filed July 18, 1966 2 Sheets-Sheet 2
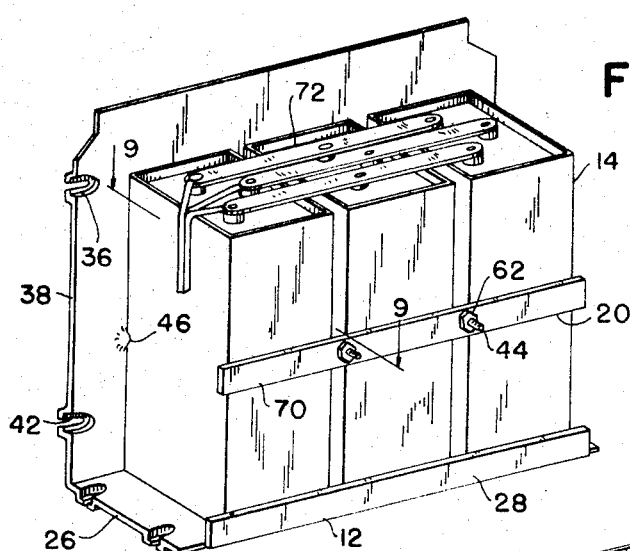
FIG. 8
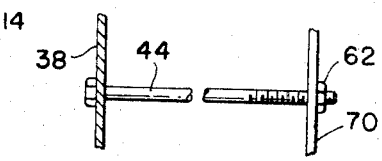
FIG. 9
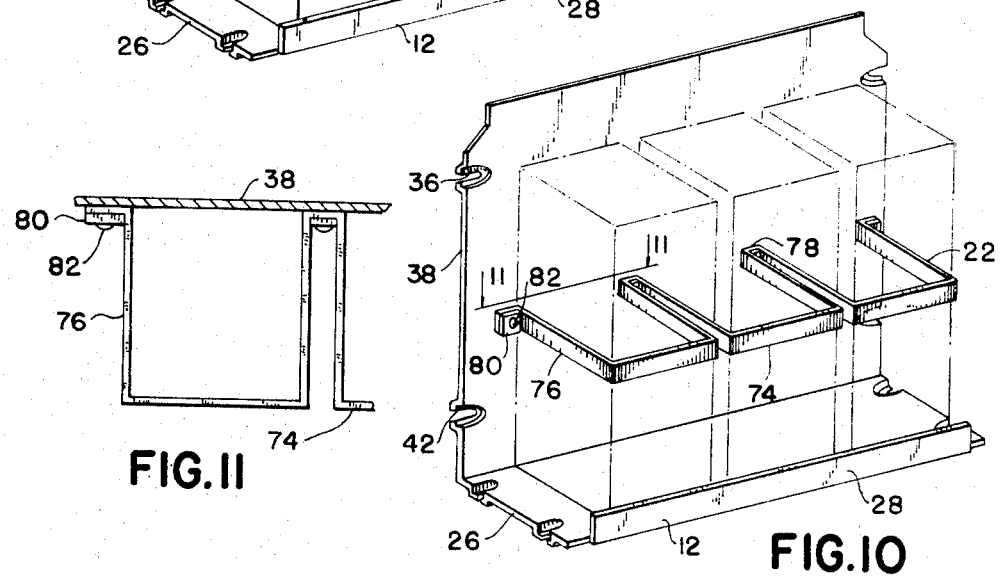
FIG. 11
FIG. 10
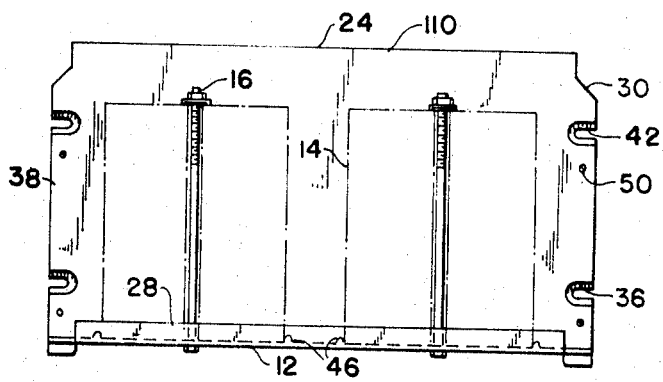
FIG. 12
INVENTOR.
MYRON J. ZUCKER
BY Whittemore
Hulbert & Belknap
ATTORNEYS

United States Patent Office 3,415,583
Patented Dec. 10, 1968

3,415,583
CAPACITOR MOUNTING CASE
Myron J. Zucker, 708 W. Long Lake Road,
Bloomfield Hills, Mich. 48013
Filed July 18, 1966, Ser. No. 565,968
7 Claims. (Cl. 312—223)

ABSTRACT OF THE DISCLOSURE

A capacitor mounting case including an L-shaped tray having means for mounting the tray by either of the perpendicular portions thereof including depressed portions in the tray having openings extending therethrough which depressed portions and openings may extend to the sides of the tray. An upwardly extending portion is provided on the side of the tray opposite the back thereof and parallel thereto and a shroud is provided for completely enclosing equipment in conjunction with the tray with the equipment spaced relative to the tray and shroud to allow installation and connection of the equipment from any side of the case. The shroud includes a front, top and two side portions and flanges extending from the two side portions for securing the shroud to the tray with the shroud over the portion of the tray parallel to the back thereof. A flange at the top fitting over the upper end of the back of the tray is also provided on the shroud.

A plurality of means for securing capacitors in the case, including screws extending through the bottom of the tray between the capacitors, brackets extending over the adjacent edges of capacitors and secured to the screws and locating abutments positioned adjacent the bottom end of the outside capacitors for preventing outward movement of the capacitors on tightening of the brackets thereon are also provided. Other means for securing capacitors in the case include bolts extending through the back of the tray, a bar positioned in surface to surface engagement with the surface of the capacitors opposite the back of the tray through which the bolts extend and a U-shaped bracket extending around the individual capacitors and secured to the back of the tray.

The invention relates to packaging assemblies and refers more specifically to improved structure for enclosing and mounting industrial equipment, such as transformers, pumps, capacitors or the like, including a chassis or tray for supporting the equipment adapted to be mounted in a plurality of different positions, and a one-piece shroud for enclosing capacitors secured to the tray.

In the past packaging assemblies, such as capacitor mounting assemblies, have generally comprised a rather deep rectangular box in which capacitors were secured and a rectangular top positioned over the box and secured thereto with screws extending through the top into the box. Straps have been secured to the box either on the back or bottom thereof extending outwardly from the box in two directions for mounting the box.

Such prior capacitor mounting assemblies have been deficient in many respects. The top has often been difficult to remove due to the positioning of the screws and the location of mounting of the assemblies. Even with the top removed access to the capacitors in the box has been difficult due to the five sided nature and depth of the box. Also, in the past it has been difficult to bring connections into and out of the capacitor mounting assemblies other than adjacent the top thereof. In addition, separate mounting trays have had to be provided in the past where an enclosed capacitor mounting assembly has not been desired.

In view of these deficiencies of the prior box and cover packaging assemblies it is desirable to enclose a piece or pieces of functional equipment, such as capacitor cells, special transformers, lamps, pumps or the like, for purposes of equipment protection, personnel safety and appearance in a tray or chassis-and-shroud structure, which structure is carefully designed so as not to fit the equipment snugly but to give space in which to run conductors, such as wire, pipe and the like, neatly and economically in and out and at the same time permitting the whole assembly to be mounted to a wall, cabinet or the like in various positions with conventional fasteners, such as bolts, anchors and the like operable in conjunction with the tray. It is to this ultimate end that the present invention is directed.

It is a specific object of the present invention to provide an improved capacitor mounting assembly.

Another object is to provide a capacitor mounting assembly including a one-piece capacitor mounting tray and an enclosing shroud which may be one-piece.

Another object is to provide a capacitor mounting assembly which is adapted to permit connection of capacitors therein in substantially any direction with equal facility by providing wiring space not commonly associated with an enclosure for electrcal equipment.

Another object is to provide a capacitor mounting assembly which is readily secured to a mounting surface in a plurality of different positions.

Another object is to provide a capacitor mounting assembly including a capacitor mounting tray and a covering shroud wherein with the shroud removed from the assembly the capacitors are substantially completely exposed so that electrical connections, both internal and external, may conveniently be made to the capacitor terminals.

Another object is to provide a capacitor mounting assembly which is constructed and arranged to permit use of the most economical structure for securing capacitors to the capacitor mounting assembly.

Another object is to provide a capacitor mounting assembly including means for securing capacitors to the assembly which does not interfere with flat bars, as opposed to insulated wire, connecting a plurality of terminals of condensers secured to the assembly.

Another object is to provide a capacitor mounting assembly which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 8 illustrates a modified structure for securing capacitors to the tray of the capacitor mounting assembly illustrated in FIGURE 1.

FIGURE 9 is an enlarged broken partial section view of the modified structure for securing capacitors to the tray illustrated in FIGURE 8, taken substantially on the line 9—9 in FIGURE 8.

FIGURE 10 is a perspective view of another modified structure for securing capacitors to the tray of the capacitor mounting assembly illustrated in FIGURE 1.

FIGURE 11 is an enlarged partial section view of the modified structure for securing capacitors to the tray illustrated in FIGURE 10, taken substantially on the line 11—11 in FIGURE 10.

FIGURE 12 is a front view of a capacitor mounting assembly as illustrated in FIGURE 1 with the shroud removed showing groupings of capacitors for connecting to separate circuits secured thereto.

With particular reference to the figures of the drawings, one embodiment of the present invention will now be considered in detail.

Figure 1:
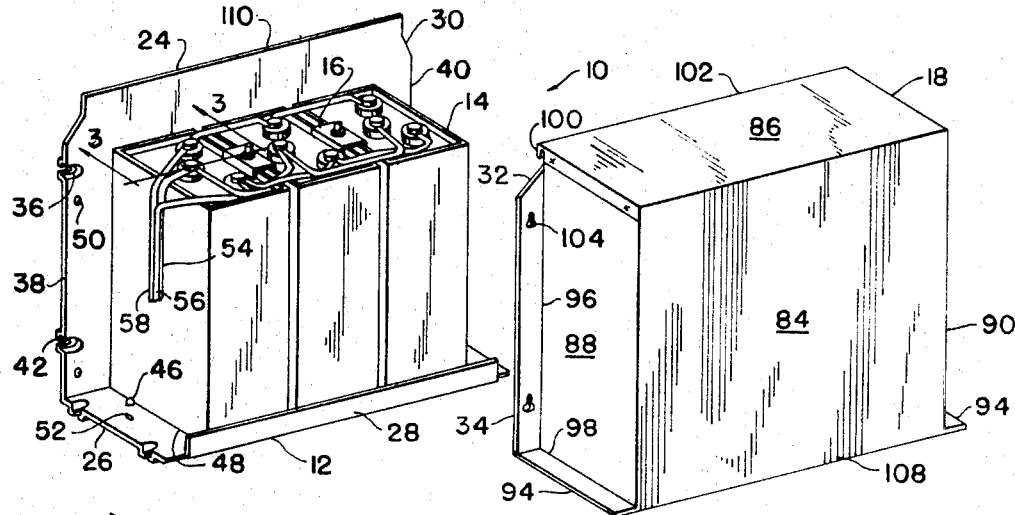
FIGURE 1 is a perspective view of a capacitor mounting assembly constructed in accordance with the invention illustrating capacitors secured in the tray part of the assembly and with the shroud part of the assembly removed therefrom.

As shown best in FIGURE 1, the capacitor mounting assembly 10 of the invention includes a mounting tray 12 on which capacitors 14 are secured by capacitor securing structure 16. The capacitors 14 are completely enclosed with the shroud 18 in conjunction with the tray 12 to complete the capacitor mounting assembly 10.

In use the capacitors 14 are secured to the tray 12 by the capacitor securing structure 16 or by one of the modified capacitor securing structures 20 and 22 illustrated in FIGURES 8 and 10. The tray 12 is then secured in the desired position therefor, as illustrated in FIGURES 4 through 7. The shroud 18 may then be secured to the tray 12 to enclose the capacitors 14 and may be removed therefrom at will for convenience in servicing of the capacitors.

More specifically, the tray 12 is an elongated L-shaped part having a back portion 24 and a bottom portion 26. The bottom portion 26 supports a flange 28 which extends upwardly, as shown in FIGURE 1, parallel to the back portion 24. The back portion 24 is provided with notches 30 at either end corresponding to the notches 32 in the flanges 34 on the shroud 18.

Depressed portions 36 are provided at both ends 38 and 40 of the tray 12 adjacent the edges thereof in the back portion 24 and the bottom portion 26, as shown best in FIGURE 1. The depressed portions 36 are provided with an opening 42 extending therethrough. Both the depressed portions 36 and the openings 42 as shown extend through the edges of the ends 38 and 40.

In mounting the tray 12 the depressed portions 36 of either the back portion 38 or the bottom portion 26 receive the heads of mounting bolts (not shown). The mounting bolts, studs, anchors, etc., extend through the openings 42 and into openings provided therefor in the supporting structure to which the capacitor is to be mounted. The depressed portions 36 besides providing a recess for the heads of mounting bolts provide spacing abutments, as shown best in FIGURE 2, for spacing the back portion or bottom portion of the tray 12 from a surface to which the tray is mounted. Thus, air is permitted to circulate behind the back portion or below the bottom portion to aid in cooling the capacitors 14 secured to the tray 12.

Another advantage of the depressed portions 36 of the tray 12 is that since the tray is spaced from a mounting surface thereby, the use of relatively cheap bolts 44 in the capacitor securing structure 16 is possible in place of the more expensive bolts having tapered heads in conjunction with tapered openings in the back portion or bottom portion of the tray 12 which were previously used.

An abutment or dimple 46 is provided in the bottom portion 26 of the tray 12 against which the outer edge 48 of the bottom of the end capacitor 14 is abutted with the capacitor 14 secured to the tray 12. The abutment 46 which is better shown in FIGURES 2 and 3 prevents the bottom of the capacitor 14 on the end of a group of the capacitors from pivoting outwardly about the inside top edge thereof on securing of the capacitors 14 to the tray 12 and holds the capacitors 14 in more secure position when the tray 12 is mounted, as for example in FIGURES 5 and 6. A second abutment or dimple 46 may be provided in conjunction with the other end capacitor 14, if desired.

The screws 50 are provided in the tray 12 and serve to secure the shroud 18 thereto, as will be considered subsequently. A center punch dimple 52 is provided in the portion of the tray 12 between the end capacitor 14 and the outer edge of the tray to align a circular cutter for cutting an access hole in the bottom portion of tray 12 for passage of the conductors 54, 56 and 58 therethrough, when desired.

The space left between the end capacitor 14 and the edge of the tray 12 at at least one of the ends of the tray permits entry into the tray 12 from substantially any direction to connect the capacitors 14 to an external circuit or connect air or hydraulic lines thereto. Thus, with the capacitor mounting assembly illustrated in FIGURE 1, ample space is provided within the volume later to be covered by the shroud for the conductors 54, 56 and 58 to be brought, for example out of the bottom of the capacitor mounting assembly 10.

Figure 3:
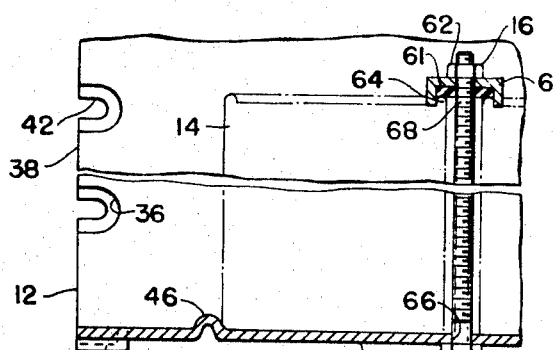
FIGURE 3 is an enlarged broken away end view of the capacitor mounting assembly illustrated in FIGURE 1 taken substantially on the line 3—3 in FIGURE 1.

The capacitor securing structure 16, as illustrated best in FIGURES 1 and 3, includes the bolts 44 extending between the capacitors 14, the U-shaped clamping members 60 and nuts 62 operable in conjunction with locating abutments 46 to secure the capacitors 14 to the tray 12. As shown, the U-shaped clamping members 60 are positioned over the flanges 64 of adjacent capacitors 14. The bolts 44 are passed through the openings 66 in the bottom portion 26 of tray 12 between the capacitors 14 and through the openings 68 in the clamping members 60. The clamping members 60 are then secured in position on tightening of the nuts 62. Cushions 61 of rubber or the like are provided between the clamping members 60 and the flanges 64 of adjacent capacitors 14 to prevent crushing of the flanges 64 on tightening of the nuts 62. As previously indicated the abutments 46 prevent the bottom edge 48 of the end capacitors 14 from pivoting outwardly on tightening of the bolts 62.

It will be noted in FIGURE 1 that the clamping members 60 prevent straight connectors extending between the inner terminals of the capacitors 14 so that bent wire connectors are usually used between the terminals of the capacitors. Should it be desired to use flat connector bars between the electrodes of the capacitors 14 one of the modified capacitor securing structures 20 and 22 illustrated in FIGURES 8 and 10 may be used.

As shown in FIGURES 8 and 9 the bolts 44 are passed through the back portion 38 of the tray 12 and through openings in a clamping bar 70 passed over the front of the capacitors 14. The clamping bar is secured against the capacitors 14 by the bolts 62 as before. The abutments 46 are moved to the back portion 38 of the tray 12 in the modified capacitor securing structure 20, as illustrated best in FIGURE 8. The flat connectors 72 are then unobstructed and may be used to connect the terminals of the capacitors 14.

In the modified capacitor securing structure 22 illustrated in FIGURES 10 and 11, a flat strap 74 is provided with a separate U-shaped portion 76 surrounding each individual capacitor 14 on three sides thereof. The strap 22 is further provided with a flat portion 78 in surface-to-surface engagement with the back portion 38 of the tray 12 between each capacitor 14. The portions 78 of the strap 22 are reinforced by square washers 80 and are secured to the back portion 38 of the tray 12 by convenient means, such as the screws 82. Again the electrodes of the capacitors 14 are unobstructed by the capacitor securing structure 22 so that they may be connected together by straight flat bars if desired.

Figure 2:
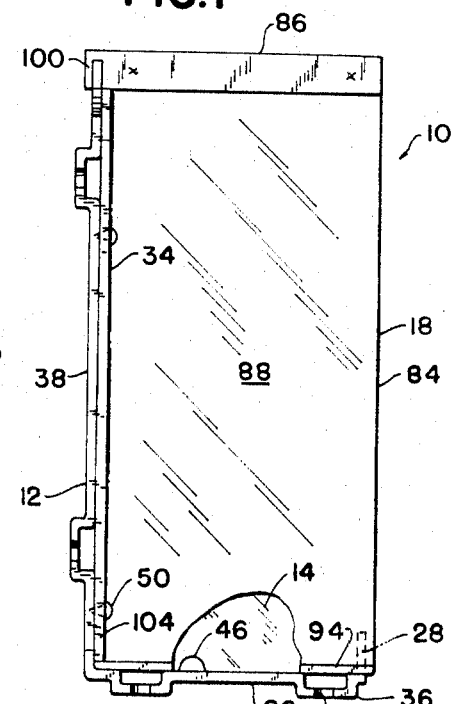
FIGURE 2 is an enlarged and elevation view of the capacitor mounting assembly illustrated in FIGURE 1 partly broken away.

The shroud 18, as illustrated best in FIGURES 1 and 2, includes a front 84, top 86 and two end portions 88 and 90. Flanges 34 and 94 extend parallel to the front portion 84 from the edges 96 and 98 of the sides 88 and 90. A locking flange 100 depends from the edge 102 of the top portion 86 of the shroud 18. The openings 104 are provided in the flange 34 to receive the screws 50.

Figure 4:
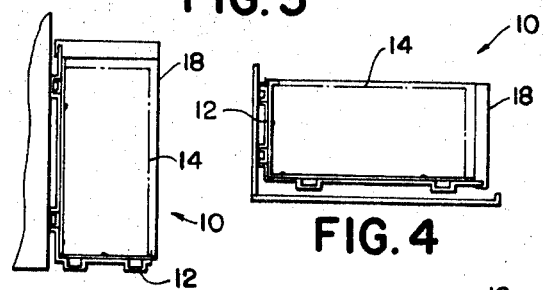
FIGURES 4 through 7 illustrate different mounting positions of the capacitor mounting assembly illustrated in FIGURE 1.
Figures 5, 6, 7:
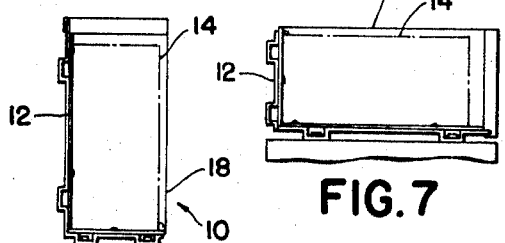

Thus in assembly, after the capacitors 14 have been secured to the tray 12 and the tray 12 has been mounted, as for example against a wall, as shown in FIGURE 5, or on an I-beam, as shown in FIGURE 6, in or on a switch box, as shown in FIGURE 4, or laid flat on a tablet, as shown in FIGURE 7, the shroud 18 is positioned on the tray 12 with the flange 100 positioned over the upper edge 110 of the back portion 38 of the tray 12 and the bottom edge 108 and ends 88 and 90 snugly fitting against the outside and end surfaces of the flange. The heads of the screws 50 are then passed through the lower circular portion of the openings 104 and the shroud 18 is pressed down so that the screws 50 pass into the narrow upper portions of the openings 104 and the screws 50 are tightened to secure the shroud 18 in place, with flanges 92 and 94 fitted against bottom 26 and back 24 in such a way as to cover the openings 36 so as to prevent entrance of dirt into the completed enclosure.

Thus it will be seen that there is provided in accordance with the invention a capacitor mounting assembly which may be mounted in a plurality of different positions in various locations without alteration. In addition it will be noted that the capacitor mounting assembly of the invention may be constructed in modules to accommodate any number of capacitors 14 or other equipment required and that due to the modular construction possible and the possible positioning of the capacitor mounting assemblies groupings of capacitor mounting assemblies may be secured to the top of cabinets and other places where desired adjacent each other and present common dimensions, such as height and width to provide an aesthetically pleasing installation. Also, as shown in FIGURE 12, the capacitors 14 may be spaced in the enclosure provided by the tray 12 and shroud 18 in separate groups for connection in separate circuits. Further it will be seen from the above description of the capacitor mounting assemblies of the invention that the capacitor mounting assemblies are particularly simple in construction, economical to manufacture and efficient in use.

While one embodiment of the capacitor mounting assembly of the invention and modifications thereof have been disclosed in detail, it will be understood that other modifications and embodiments are contemplated. Thus, while the structure disclosed in the drawings is indicated as being metal, it will be understood that plastic or other materials may be substituted therefor. It is the intention to include all embodiments and modifications as are defined by the appended claims within the scope of the invention.

What I claim as my invention is:

1. An equipment mounting assembly comprising an elongated, generally L-shaped tray having a bottom portion and a back portion for receiving equipment to be mounted, means for mounting the tray, means for rigidly securing equipment to the tray, a shroud for completely enclosing the equipment in conjunction with the tray, including at least two relatively perpendicular portions, and means for securing the shroud to the tray including flanges extending outwardly from the two perpendicular portions parallel to the back and bottom portions of the tray to make surface to surface engagement therewith, and screws extending through the flanges and held in the tray.

2. Structure as set forth in claim 1 wherein the equipment is capacitors and the means for securing the capacitors to the tray comprises openings extending through the bottom portion of the tray between the capacitors, bolts extending through the openings in the bottom portion of the tray and between the capacitors, clamping members positioned over the end of the bolts and extending over the top edge of two adjacent capacitors, a bolt securing the clamping member tightly against the tops of the adjacent capacitors and a locating abutment raised from the bottom portion of the tray at the outside of the bottom of the end capacitors on each tray.

3. Structure as set forth in claim 1 wherein the equipment is capacitors and the means for securing the capacitors to the tray comprises openings in the back portion of the tray between adjacent capacitors, bolts extending through the openings in the back portion of the tray and between adjacent capacitors, a clamping bar extending across the front of the capacitors having openings therein positioned over the bolts, nuts secured to the ends of the bolts forcing the clamping bar against the fronts of the capacitors, a locating abutment in the back portion of the tray at the outside of the back of the end capacitors whereby the capacitor terminals may be connected by flat connecting bars without interference of the means for securing the capacitors to the tray.

4. Structure as set forth in claim 1 wherein the equipment is spaced itself and is spaced on the tray and the shroud to allow space for installation and connection of the equipment.

5. Structure as set forth in claim 1 wherein the tray further includes an upwardly extending portion at the front end of the bottom portion and the shroud includes a flange at the top thereof adapted to fit over the upper end of the back portion of the tray with the lower end of the front portion of the shroud fitting securely against the upwardly extending portion at the front end of the bottom of the tray which upwardly extending portion is of such a length as to just fit within the shroud between ends thereof.

6. An equipment mounting assembly comprising an elongated, generally L-shaped tray having a bottom portion, a back portion for receiving equipment to be mounted and an upwardly extending portion at the front end of the bottom portion, means for mounting the tray, means for rigidly securing the equipment to the tray, a shroud for completely enclosing the equipment in conjunction with the tray, including a flange at the top thereof adapted to fit over the upper end of the back portion of the tray with the lower end of the front portion of the shroud fitting securely against the upwardly extending portion at the front end of the bottom of the tray, and means for securing the shroud to the tray.

7. A capacitor mounting assembly comprising an elongated, generally L-shaped tray having a bottom portion and a back portion for receiving capacitors to be mounted, means for mounting the tray and means for rigidly securing the capacitors to the tray including a flat strap having a U-shaped portion extending around each of the capacitors and flat connecting portions extending between the U-shaped portions, washers secured to the flat connecting portions and bolts extending through the washers and holes in the flat connecting portions and through the back portion of the tray.

References Cited

UNITED STATES PATENTS

| | | | |
|---|---|---|---|
| 1,765,410 | 6/1930 | Folberth et al. | 248—300 |
| 1,929,562 | 10/1933 | Pierce | 211—88 XR |
| 2,294,006 | 8/1942 | Thorsheim | 248—311 |
| 2,435,463 | 2/1948 | Pettingill | 248—309 XR |
| 2,459,692 | 1/1949 | Fletcher | 248—300 XR |
| 2,461,198 | 2/1949 | Chiger | 248—361 XR |
| 2,792,999 | 5/1957 | Lorentzen | 248—300 XR |
| 2,878,301 | 3/1959 | Dierstein et al. | 248—300 XR |
| 3,125,177 | 3/1964 | Paller | 248—361 XR |

ROY D. FRAZIER, *Primary Examiner.*

W. D. LOULAN, *Assistant Examiner.*

U.S. Cl. X.R.

211—88